(12) United States Patent
West

(10) Patent No.: US 6,212,085 B1
(45) Date of Patent: Apr. 3, 2001

(54) INTEGRATED DUAL VOLTAGE SOURCED INVERTER

(75) Inventor: Orrin B. West, Canton, MI (US)

(73) Assignee: Ecostar Electric Drive Systems L.L.C., Dearborn, MI (US)

( * ) Notice: Subject to any disclaimer, the term of this patent is extended or adjusted under 35 U.S.C. 154(b) by 0 days.

(21) Appl. No.: 09/593,613

(22) Filed: Jun. 13, 2000

(51) Int. Cl.$^7$ ................................................. H02M 7/5387
(52) U.S. Cl. ......................................................... 363/132
(58) Field of Search ................................. 363/17, 41, 132

(56) References Cited

U.S. PATENT DOCUMENTS 4,244,017 * 1/1981 Steigerwald ............................ 363/49

* cited by examiner

Primary Examiner—Shawn Riley
(74) Attorney, Agent, or Firm—Mark S. Sparschu

(57) ABSTRACT

An inverter circuit system for controlling the voltage level at the neutral point of a three-phase wye-connected load. A dc voltage source such as a pair of batteries in series and having first and second poles is connected by one pole to an inverter bus and connected by the other pole via an inductive impedance to the neutral point of a three-phase wye-connected load.

11 Claims, 1 Drawing Sheet

INTEGRATED DUAL VOLTAGE SOURCED INVERTER

BACKGROUND OF THE INVENTION

In a wye-connected load such as a three-phase inductance, dc brushless motor or a similar device, a rotary field is established by a set of permanent magnets, and a stationary field is established by a set of phase windings on a stator having a neutral post or point. A position-sensing device detects the appropriate stator windings via an inverter containing switching devices. Controlling the conduction of the inverter by a switching referred to as a commutation provides control of the direction of rotation of the motor. Controlling the conduction of the inverter by a switching referred to as pulse width modulation (PWM) provides control of the speed of the motor. In the operation of the motor, both commutation and pulse width modulation take place concurrently.

SUMMARY OF THE INVENTION

The present invention relates to inverter circuits to control the neutral point of a three-phase wye-connected load. In the invention a dc voltage source is connected by one pole to a pulse-width modulated (PWM) style inverter bus and by the other pole to the neutral point of an ac three-phase wye-connected load in series with an inductive impedance.

A feature of the present invention is that an inverter circuit is provided wherein the negative pole of a dc voltage source is connected to the inverter negative bus and the positive pole of the dc voltage source is connected to the neutral point of a three-phase load to control the voltage level at the neutral point of the load.

Another feature of the present invention is that an inverter circuit is provided wherein the positive pole of a dc voltage source is connected to the inverter positive bus and the negative pole of the dc voltage source is connected to the neutral point of a three-phase load to control the voltage level at the neutral point of the load.

BRIEF DESCRIPTION OF THE DRAWINGS

The above set forth objects and other features of the invention are made more apparent in the ensuing detailed description of the invention when read in conjunction with the attached drawings, wherein.

DESCRIPTION OF THE INVENTION

Figure 1:
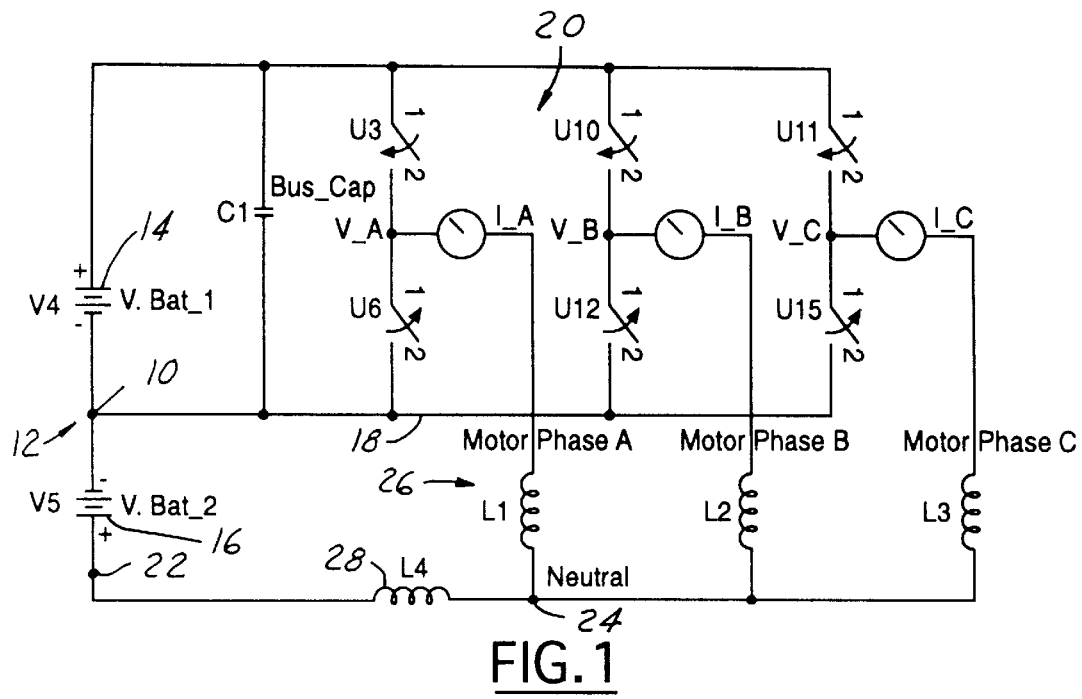
FIG. 1 is a schematic illustration of an embodiment of an inverter circuit according to the principles of the present invention wherein the negative pole of a dc voltage source is connected to the negative bus of an inverter circuit and the positive pole of the dc voltage source is connected to the neutral point of a three-phase load.

In the embodiment illustrated in FIG. 1 the negative pole 10 of a dc voltage source 12 consisting of batteries 14 and 16 is connected to the negative bus 18 of an inverter circuit 20. The positive pole 22 of the dc source is connected to the neutral point 24 of wye-connected three-phase induction motor 26 via an inductive impedance 28.

The following description of the invention assumes an induction motor load for purposes of explanation, however the present invention may be employed with other types of loads, such as the motor and transformers mentioned above. The key characteristic of the load employed in the present invention is that it is wye-connected and that the intended behavior of the load will not be affected by equal dc currents flowing in each phase except for additional rms heating effects.

The basic principle employed by the present invention for the control of the voltage level at the neutral point voltage of the wye-connected load such as an ac induction motor 26, is that there exists or can be made to exist a degree of freedom to control the voltage level at the load neutral point without affecting the behavior of the load.

Thus, in FIG. 1, the inverter circuit 20 raises or lowers the voltage at neutral point 24 of an ac motor load with respect to the dc voltage source 12 connected across the inverter circuit bus 18 and the neutral point 24 such that a current can be caused to flow to the ac load in to or out of the dc voltage source 12.

By independently controlling the current in each phase of the ac motor load 26 it can be ensured that the neutral current is evenly divided into the three load phases A, B and C. Then, since ac loads of motor or transformer types are not affected by equal currents in each phase the ac motor load is not effected by the dc current at the neutral point 24.

The degree of freedom to control the voltage level at the neutral point 24 is achieved when the voltage on the inverter bus 18 is greater than that required by the wye-connected motor load 26. This allows for a range for the voltage at the neutral point 24 to be adjusted while still maintaining the required load voltage.

For three phase loads of motor or transformer types, the voltage at the neutral point 24 can be controlled by the inverter 20 independently of load magnitude or power factor. Thus the power from the dc source 12 connected to the neutral point 24 can be controlled independently of the motor load 26.

The purpose of the inductive impedance 28 placed in series with the neutral point 24 is to control the neutral ripple current caused by the switching action of the pulse width modulated style inverter 20. The impedance 28 can be sized accordingly as to whether simple modulation, third harmonic injection or six-step inverter operation is desired.

The degree of freedom to control the voltage at neutral point 24 is affected by the actual voltage values of the bus 18 and the neutral connected source voltages 14 and 16 as well as their internal impedances, by the characteristics of motor load 26 and by the load output power. For this reason the most advantageous usage of this concept will occur by system optimization around the limitations.

Figure 2:
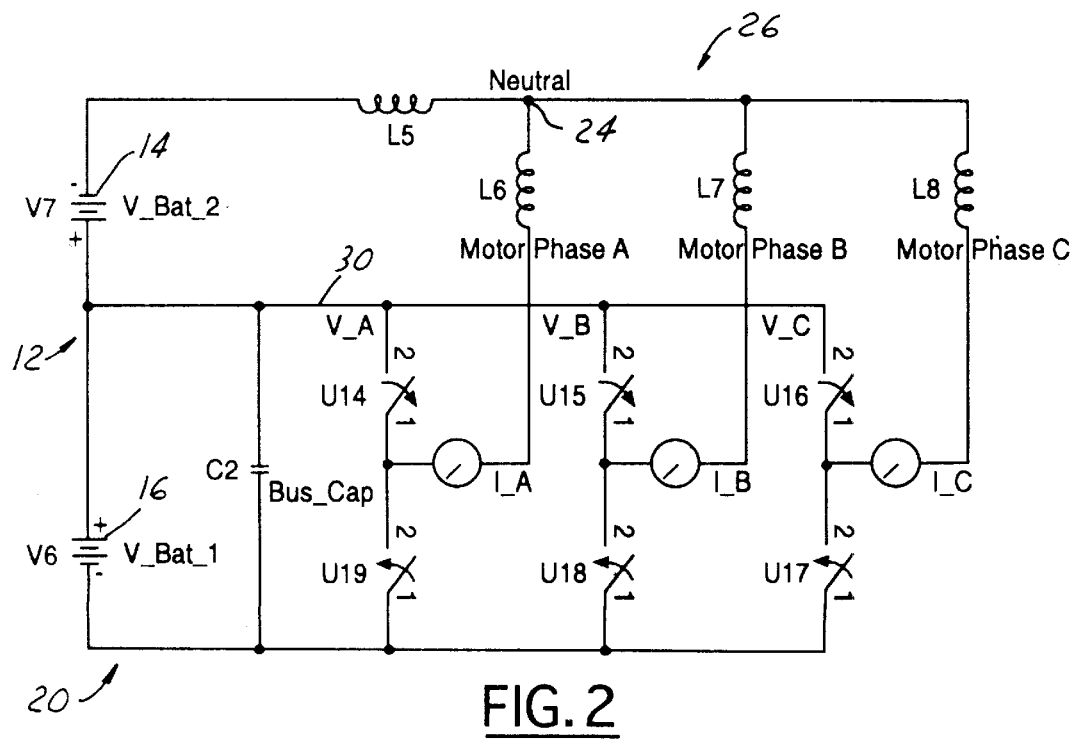
FIG. 2 is a schematic illustration of an embodiment of an inverter circuit according to the principles of the present invention wherein the positive pole of a dc voltage source is connected to the positive bus of an inverter circuit and the negative pole of the dc voltage source is connected to the neutral point of a three-phase load.

In the embodiment of FIG. 2, the operation of the invention is essentially the same as for FIG. 1 except that the positive pole of the dc source 12 is connected to a positive inverter bus 30.

The three-phase wye-connected load may be a motor of inductance, synchronous, reluctance or brushless-dc type, or the three-phase wye-connected load may be a transformer secondary or primary winding.

While the invention has been described in connection with preferred embodiments, it is not intended to limit the scope of the invention to the particular form set forth, but, on the contrary, it is intended to cover such alternatives, modifications, and equivalence as may be defined in the appended claims.

What is claimed is:

1. An inverter circuit system for controlling a wye-connected load comprising;

A wye-connected load device having a neutral point connection;

An inverter circuit including a bus;

And a source of dc voltage having a positive pole and a negative pole wherein a first one of the poles of the source of dc voltage is connected to the bus of the inverter circuit and the second one of the poles of the source of dc voltage is connected to the neutral point of the wye-connected load to vary the voltage level at the neutral point of the wye-connected load.

2. The inverter circuit system of claim 1 wherein the negative pole of the source of dc voltage is connected to a negative bus of the inverter circuit and the positive pole of the source of dc voltage is connected to the neutral point connection of the wye-connected load.

3. The inverter circuit system of claim 1 wherein the positive pole of the source of dc voltage is connected to a positive bus of the inverter circuit and the negative pole of the source of dc voltage is connected to the neutral point connection of the wye-connected load.

4. The inverter circuit system of claim 1 wherein the wye-connected load is a three-phase ac load and the voltage level at the neutral point connection of the wye-connected three-phase ac load produces equal values of current in the phases of the wye-connected three-phase ac load without affecting the behavior of the ac load.

5. The inverter circuit system of claim 1 further including an inductive impedance device connected in series between the second one of the poles of the source of dc voltage and the neutral point connection of the wye-connected load.

6. The inverter circuit system of claim 1 wherein the wye-connected load is an inductance type motor.

7. The inverter circuit system of claim 1 wherein the wye-connected load is a synchronous type motor.

8. The inverter circuit system of claim 1 wherein the wye-connected load is a reluctance type motor.

9. The inverter circuit system of claim 1 wherein the wye-connected load is a brushless-dc type motor.

10. The inverter circuit system of claim 1 wherein the wye-connected load is a transformer.

11. The inverter circuit system of claim 1 wherein the bus of the inverter circuit is a pulse width modulated type inverter bus.

* * * * *